UNITED STATES PATENT OFFICE.

HARRY JENNINGS, OF BOSTON, MASSACHUSETTS.

IMPROVED ARSENICAL SOAP.

Specification forming part of Letters Patent No. 43,506, dated July 12, 1864.

*To all whom it may concern:*

Be it known that I, HARRY JENNINGS, of Boston, in the county of Suffolk and State of Massachusetts, have invented a new and Improved Composition for Soap; and I do hereby declare that the following is a full, clear, and exact description of the same.

This invention consists in a composition of whale-oil soap or other suitable soap and arsenious acid mixed together in about the proportions hereinafter specified, and with or without some coloring-matter—such as Venetian red—in such a manner that a soap is produced which can be used with advantage for the destruction of fleas and other parasitic insects which infest the skins of living animals, and that this soap, when mixed with coloring-matter, can be readily distinguished from ordinary soap.

The proportion in which I mix the ingredients of my compound together is about as follows: whale-oil soap, twenty pounds; arsenious acid, eight to ten ounces. These ingredients are combined by first melting soap, and then stirring in the arsenious acid until a perfect combination is made and the arsenious acid is uniformly diffused through the mass. In order to give color to this saponaceous compound, about four or five ounces of Venetian-red pigment may be added to twenty pounds of soap; or, instead of the Venetian red, any other suitable pigment may be taken to impart to this soap a certain color, whereby it can be distinguished from other kinds, so as to prevent accidents.

This preparation is particularly intended for the destruction of fleas, bugs, and all parasitic vermin upon the surface of any living animal, and it has been applied with wonderful effect for destroying ticks on sheep and vermin on dairy-cattle and farm-yard stock generally; also, for destroying bugs in bedsteads. The compound has also been used by physicians for human beings who may be suffering from cuticular annoyances.

It is obvious that in using this compound great care must be taken on account of its poisonous properties.

The effect of my soap will be readily understood if it is considered that whale-oil soap alone is poisonous to insects which infect plants, and its solution is employed by gardeners for this purpose. It is also a common practice among taxidermists to use arsenic mixed with common and camphorated soap for the protection of the skins of birds and of other dead skins kept in museums; and, furthermore, arsenite of soda is employed in the preservation of the hides of animals from the depredations of worms; but by reason of the large proportion of arsenic employed none of these compositions as hitherto made are adapted to be used without injurious effect upon the skin of a living animal and at the same time effect the object I have in view.

By combining the whale-oil soap with arsenious acid the destructive effect of the compound is increased and the application of the same to living animals or to human beings is rendered practicable.

What I claim as new, and desire to secure by Letters Patent, is—

A composition of whale-oil soap or other suitable soap and arsenious acid mixed in such proportions as to adapt the compound for the destruction or removal of vermin or impurities upon the skins of living animals.

HARRY JENNINGS.

Witnesses:
M. M. LIVINGSTON,
J. W. COOMBS.